(12) United States Patent
Fukushima

(10) Patent No.: US 7,182,394 B2
(45) Date of Patent: Feb. 27, 2007

(54) WEATHER STRIP FOR DOUBLE DOOR OF AUTOMOBILE

(75) Inventor: Takashi Fukushima, Hiroshima-ken (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 169 days.

(21) Appl. No.: 10/995,716

(22) Filed: Nov. 22, 2004

(65) Prior Publication Data

US 2005/0194751 A1    Sep. 8, 2005

(30) Foreign Application Priority Data

Mar. 5, 2004    (JP) .............................. 2004-062477

(51) Int. Cl.
*B60J 10/08* (2006.01)

(52) U.S. Cl. .................................................. 296/146.9

(58) Field of Classification Search ............. 296/146.9; 49/475.1, 476.1, 479.1, 484.1, 489.1, 498.1
See application file for complete search history.

(56) References Cited

U.S. PATENT DOCUMENTS

| 4,976,069 | A  | * | 12/1990 | Arima et al. .............. 49/490.1 |
| 6,443,519 | B1 | * | 9/2002  | Betzl .......................... 296/213 |
| 6,536,161 | B2 | * | 3/2003  | Saito ........................... 49/368 |
| 2004/0088925 | A1 | * | 5/2004  | Nozaki ..................... 49/498.1 |
| 2004/0247827 | A1 | * | 12/2004 | Kubo et al. ................ 428/136 |
| 2004/0250474 | A1 | * | 12/2004 | Kubo et al. .............. 49/479.1 |
| 2006/0112645 | A1 | * | 6/2006  | Dron ......................... 49/498.1 |

* cited by examiner

*Primary Examiner*—H Gutman
(74) *Attorney, Agent, or Firm*—Flynn, Thiel, Boutell & Tanis, P.C.

(57) ABSTRACT

There is provided a weather strip for a double door of an automobile which has a center seal portion and a seal body. The center seal portion has a main seal and a closing seal, whereas the seal body is integrally formed with a roof seal, an end seal and a lower seal. An upper end portion of the closing seal of the center seal portion is connected to an edge end portion of the roof seal of the seal body by a die molding. A lower end portion of the closing seal of the center seal portion is connected to an edge end portion of the lower seal of the seal body by a die molding.

4 Claims, 5 Drawing Sheets

WEATHER STRIP FOR DOUBLE DOOR OF AUTOMOBILE

BACKGROUND OF THE INVENTION

This invention relates to a weather strip installed to an automobile door which is built in a double door style.

There have conventionally been used a pair of side doors or back doors in an automobile which are formed in a double door style (hereinafter referred to as "a double door"). As illustrated in FIG. 1, as a weather strip installed to such a double door 20 provided in an automobile body 3, there has been used one which comprises a center seal portion 11 which takes place in a front end portion of a rear door 1 confronting a rear end portion of a front door 2, and which is composed merely of a main seal 12 and not composing a closing seal 13.

Further, as illustrated in FIG. 2, there has been used a weather strip 30 which comprises a center seal portion 11 and a seal body 14, and the center seal portion 11 comprises a main seal 12 as well as a closing seal 13. In this weather strip 30, the center seal portion 11 and the seal body 14, which is formed of a roof seal 15, an end seal 16 and a lower seal 17, are individually structured for the reason of an easy production and a easy management.

However, in the former conventional weather strip not comprising the closing seal 13 in the center seal portion 11, there is a problem that it induces a wind noise and the sound insulation property thereof is not satisfactory since it does not comprise the closing seal 13.

Further, in the latter conventional weather strip in which the center seal portion 11 and the seal body 14 are individually structured, there is a problem that the noise insulation property thereof is poor because there is consequently formed a cut line where sealing is not properly done (herein after referred to as "a seal cut line") in the connecting portion between the center seal portion 11 and the seal body 14.

Moreover, there is also a problem in both of the conventional weather strips that water invades into an interior side of an automobile through a gap between a bottom surface of the roof seal 15 and a door panel, because the drainage of rain water or washing water trapped on the roof seal 15 is unsatisfactorily performed.

SUMMARY OF THE INVENTION

It is therefore an object of this invention to provide a door weather strip for a double door of an automobile, which can prevent an occurrence of a wind noise and is superior in a noise insulating property. Further, it is another object of this invention to provide a weather strip which is improved in a drainage property of water trapped on a roof seal of the weather strip.

According to a first aspect of the invention there is provided a weather strip for a double door of an automobile which comprises a center seal portion 11 and a seal body 14. The center seal portion 11 comprises a main seal 12 and a closing seal 13. The seal body 14 is integrally formed with a roof seal 15, an end seal 16 and a lower seal 17. An upper end portion of the closing seal 13 of the center seal portion 11 is connected to an edge end portion of the roof seal 15 of the seal body 14 by a die molding. A lower end portion of the closing seal 13 of the center seal portion 11 is connected to an edge end portion of the lower seal 17 of the seal body 14 by a die molding.

According to a second aspect of the invention, there is provided a weather strip for a double door of an automobile which comprises a center seal portion 11 and a seal body 14. The center seal portion 11 comprises a main seal 12 and a closing seal 13. The seal body 14 is integrally formed with a roof seal 15, an end seal 16 and a lower seal 17. An upper end portion of the closing seal 13 of the center seal portion 11 is connected to an edge end portion of the roof seal 15 of the seal body 14 by a die molding. A lower end portion of the seal portion 11 is connected to an edge end portion of the lower seal 17 of the seal body 14 by a die molding.

According to a third aspect of the invention, there is provided a weather strip for a double door of an automobile as provided in the first aspect of the invention, wherein the roof seal 15 comprises an outside wall 15a nearby the center seal portion 11. The outside wall 15a comprises a hole portion 15b formed therethrough in communication with a hollow portion 15c of the roof seal 15. The hole portion 15b is used to pass water 60, which is trapped in a gap between the outside wall 15a and a door panel 1a, therethrough and drain it outside of an automobile via an air hole portion 13a of the closing seal 13.

According to a fourth aspect of the invention, there is provided a weather strip for a double door of an automobile as provided in the second aspect of the invention, wherein the roof seal 15 comprises an outside wall 15a nearby the center seal portion 11. The outside wall 15a comprises a hole portion 15b formed therethrough in communication with a hollow portion 15c of the roof seal 15. The hole portion 15b is used to pass water 60, which is trapped in a gap between the outside wall 15a and a door panel 1a, therethrough and drain it outside of an automobile via an air hole portion 13a of the closing seal 13.

According to a first aspect of the invention, the center seal portion 11 is provided with the closing seal 13, so that a wind noise is prevented from occurring, and at the same time, a noise insulation property of the weather strip 10 is improved by an effect of two sealing members of the main seal 12 and the closing seal 13.

Further, the upper end portion of the center seal portion 11 is connected to the edge end portion of the roof seal 15 by the die molding, and the lower end of the closing seal 13 of the center seal portion 11 is connected to the edge end portion of the lower seal 17, so that no seal cuts are formed in those connecting portions. Therefore, the noise insulation property of the weather strip 10 is improved.

According to the second aspect of the invention, like the first and second aspects of the inventions, the center seal portion 11 is provided with the closing seal 13, so that a wind noise is prevented from occurring, and that the noise insulation property can be improved. Further, the upper end portion of the center seal portion 11 is connected to the edge end portion of the roof seal 15 of the seal body 14 by the die molding, so that no seal cuts are formed in the connecting portion, thereby improving the noise insulation property of the weather strip 10.

Further, in this preferred embodiment, the lower end portion of the center seal portion 11 is connected to the edge end portion of the lower seal 17 of the seal body 14, so that no seal cuts are formed in the connecting portion as well, thereby the sealing property of the weather strip 30 is further improved.

Moreover, the lower end portions of the main seal 12 and the closing seal 13 are also connected with each other by the die molding, so that there are not formed seal cuts between them, and that the noise insulation property of the weather strip 10 is further improved.

According to the third and fourth aspects of the inventions, there is formed the hole portion 15b in the outside wall 15a of the center seal portion 11 nearby the roof seal 15 in order to drain the water 60, which is trapped in a gap formed between the outside wall 15a and the door panel 1a, outside of the automobile through the hole portion 15b and the air hole portion 13a of the closing seal 13, so that an invasion of the water 60 into an interior of the automobile is prevented.

Figure 9:
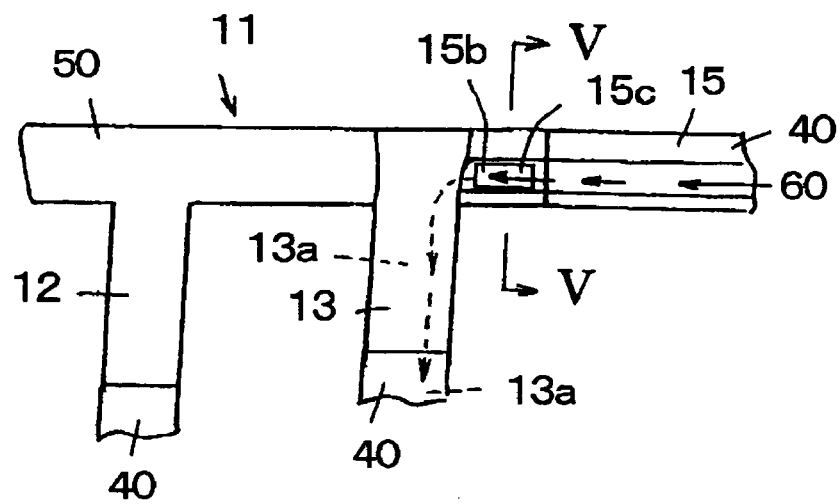
FIG. 9 is a side elevation view showing a substantial part of another weather strip according to the invention pointed by "70" in FIG. 8.
Figure 10:
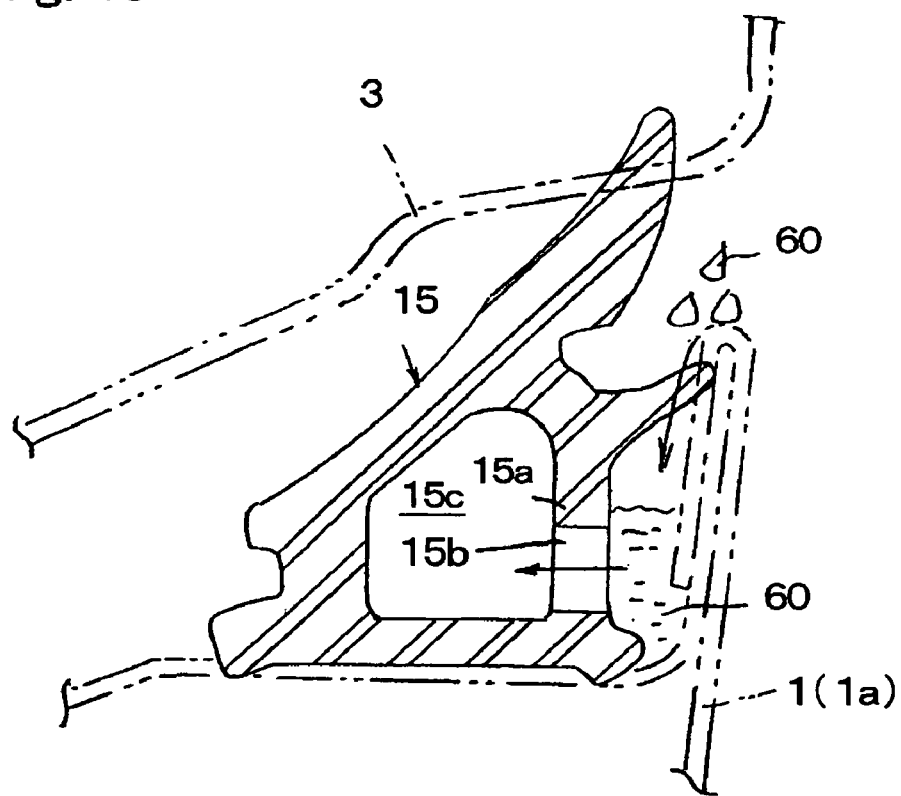

and, FIG. 10 is a sectional view along line V—V in FIG. 9.

DETAILED DESCRIPTION OF THE INVENTION

Referring to FIGS. 3 to 7, there will be described a weather strip for a double door of an automobile according to a first preferred embodiment of the invention. This weather strip 10 is installed to a rear door 1 of a double door of an automobile comprising a front door 2 and the rear door 1. The weather strip 10 comprises a center seal portion 11, which comprises a main seal 12 and a closing seal 13, as well as a seal body 14 which is integrally formed with a roof seal 15, an end seal 16 and a lower seal 17. The weather strip 10 is structured by connecting an upper end portion of the center seal portion 11 to a front end portion of the roof seal 15 of the seal body 14 by a die molding.

This die molding is completed by extrusion molding each of the main seal 12 and the closing seal 13 to form an extrusion mold part 40 respectively, followed by a process of placing the upper portions of the seals 12, 13 in a die with the front end portion of the roof seal 15, and then by injecting rubber material in the die to connect the seals 12, 13, 15 and to form a die mold part 50. In the same manner, the lower end portion of the closing seal 13 is placed in a die with the front end portion of the lower seal 17, upon injecting rubber material in the die to connect the seals 13, 17 and to form a die mold part 50.

According to the weather strip 10 in this preferred embodiment of the invention, the center seal portion 11 is provided with the closing seal 13, so that a wind noise is prevented from occurring and a noise insulation property is improved. Further, the upper end portion of the center seal portion 11 is connected to the front end portion of the roof seal 15 of the seal body 14 by the die molding, while the lower end portion of the closing seal 13 is connected to the edge end portion of the lower seal 17 by a die molding, so that there are formed no seal cuts in those connecting portions, and that there can be provided a weather strip with a high noise insulation property.

Figure 1:
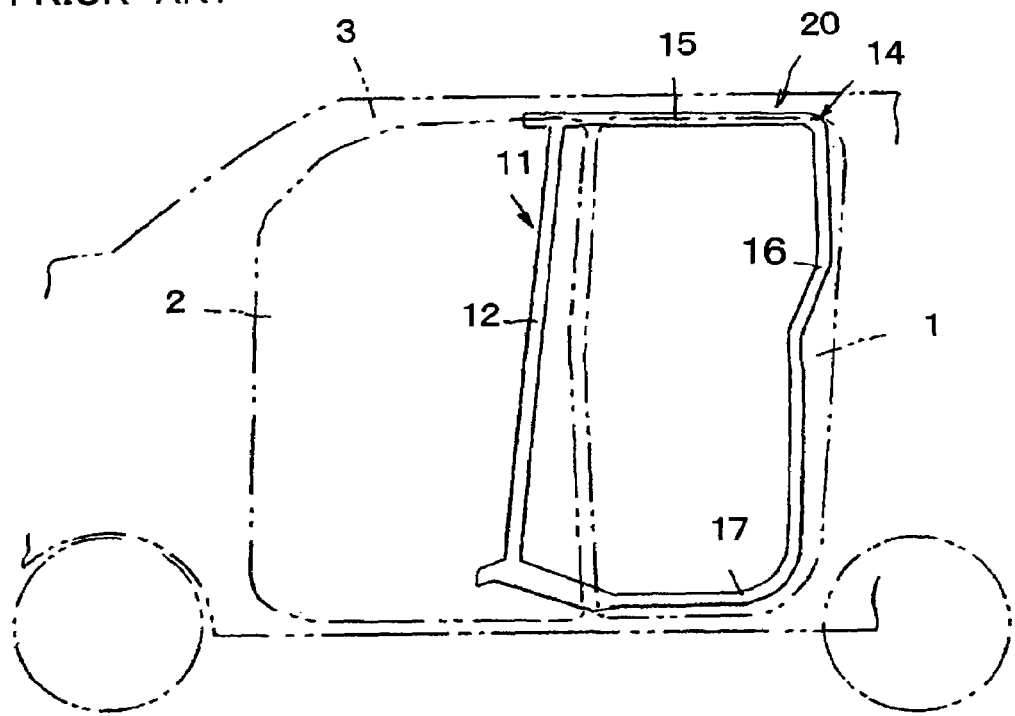
FIG. 1 is a side elevation view showing a weather strip according to a prior art.
Figure 2:
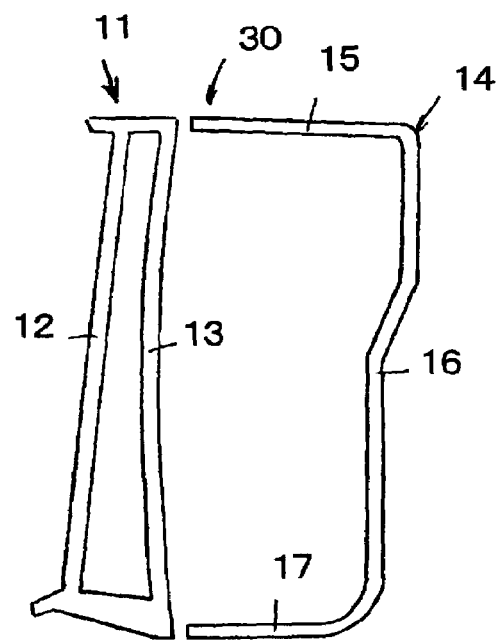
FIG. 2 is a side elevation view showing a weather strip according to another prior art.
Figure 3:
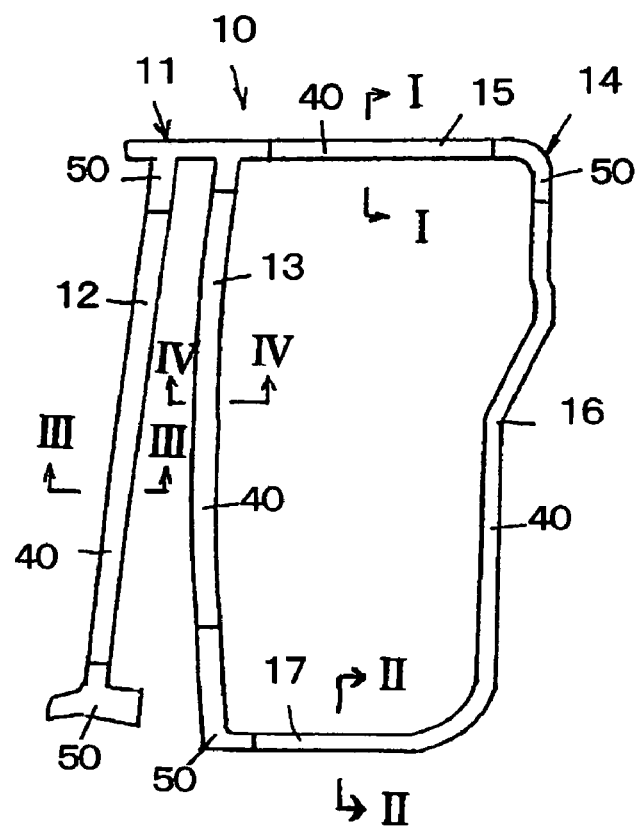
FIG. 3 is a side elevation view showing a first preferred embodiment of the invention.
Figure 4:
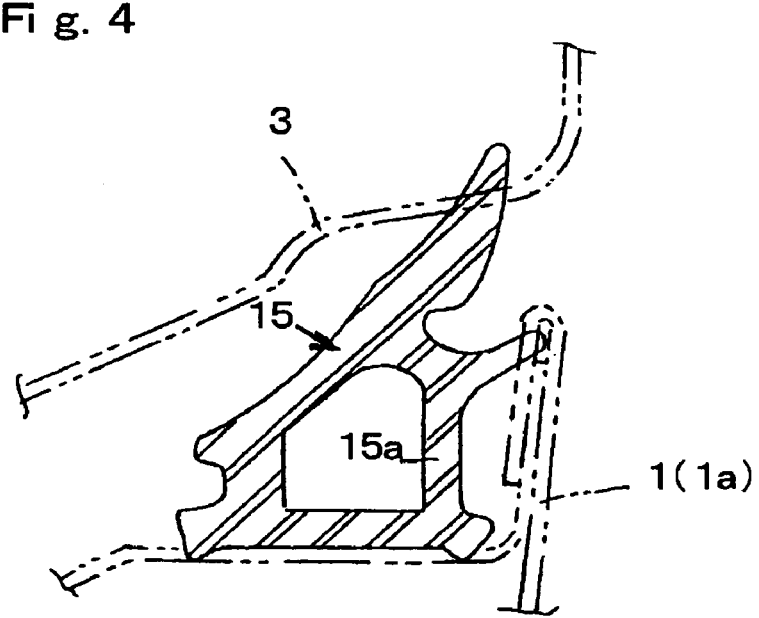
FIG. 4 is a sectional view along line I—I in FIG. 3.
Figure 5:
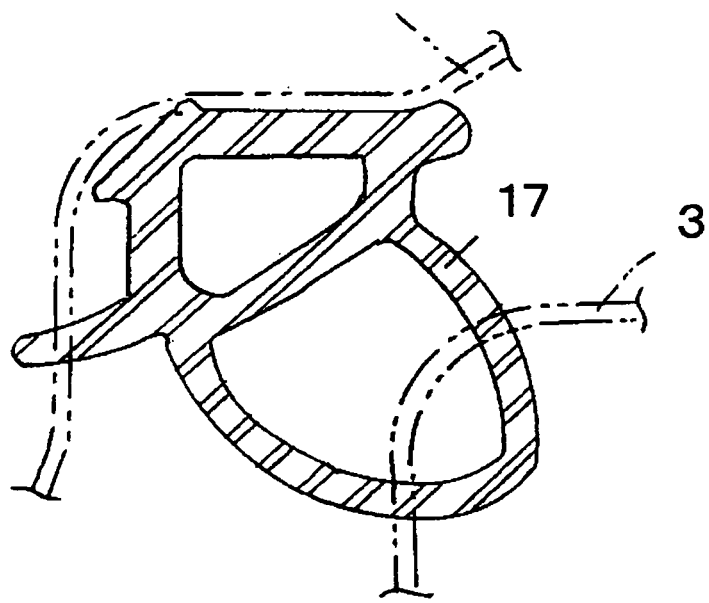
FIG. 5 is a sectional view along line II—II in FIG. 3.
Figure 6:
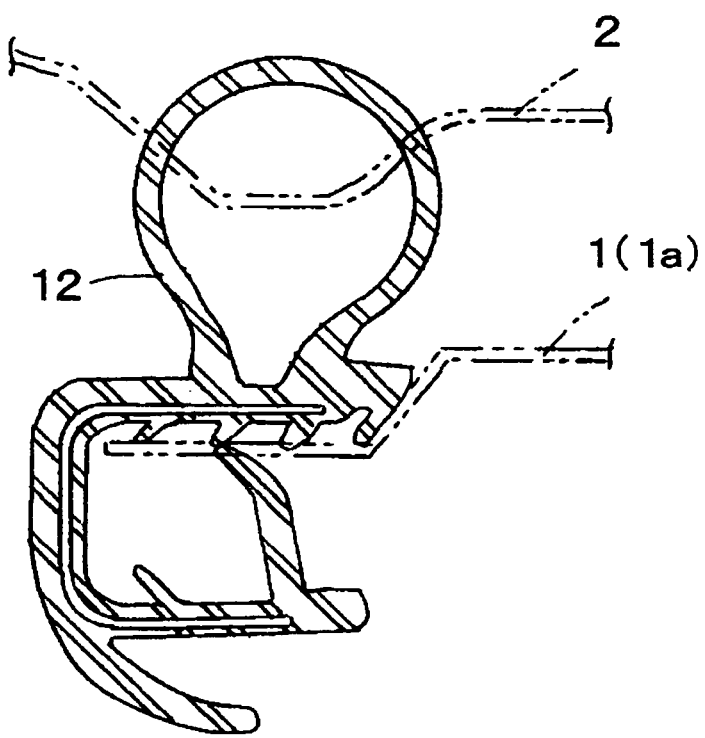
FIG. 6 is a sectional view along line III—III in FIG. 3.
Figure 7:
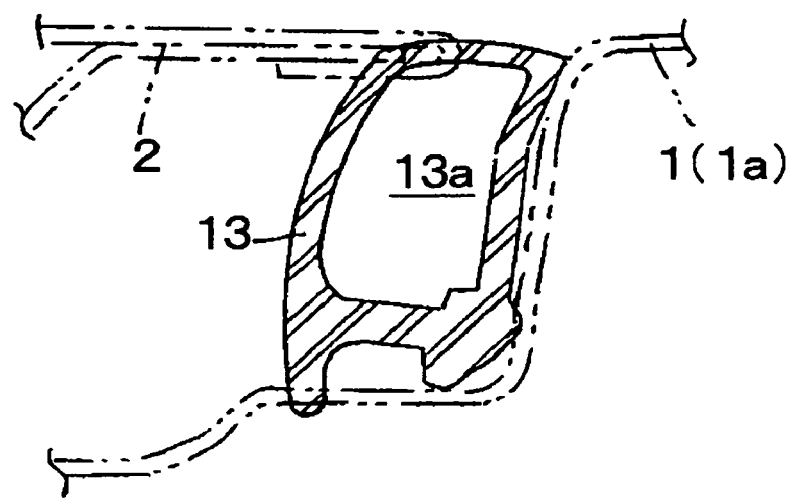
FIG. 7 is a sectional view along line IV—IV in FIG. 3.
Figure 8:
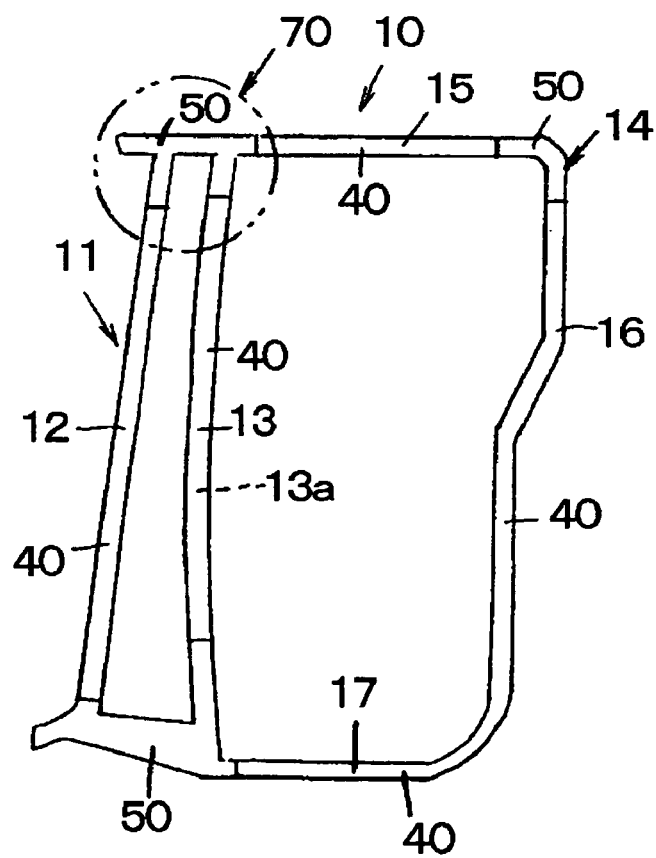
FIG. 8 is a side elevation view showing a second preferred embodiment of the weather strip according to the invention.

Referring to FIG. 8, a weather strip 10 for a double door of an automobile according to a second preferred embodiment of the invention will be described. This weather strip 10 is also installed to a rear door 1 of a double door of an automobile comprising a front door 2 and the rear door 1. An upper end portion of the center seal portion 11 is connected to a front end portion of a roof seal 15 of a seal body 14 by a die molding and a lower end portion of the center seal portion 11 is connected to a front end portion of the lower seal 17 by a die molding as well.

According to this weather strip 10, like the aforementioned weather strip, the center seal portion 11 is provided with the closing seal 13, so that the wind noise can be prevented from occurring, and that the noise insulation property of the weather strip 10 can be improved. Further, the upper end portion of the center seal portion 11 is connected to the front end portion of the roof seal 15 of the seal body 14 by the die molding, so that no seal cuts are formed in the connecting portion, and that the noise insulation property of the weather strip 10 is improved.

Further, the lower end portion of the center seal portion 11 is connected to the edge end portion of the lower seal 17 of the seal body 14, so that no seal cuts are formed in the connecting portion of the lower seal 17 and the seal body 14, and that the sealing property of the weather strip 10 is further improved.

Moreover, according to this embodiment, the lower end portions of the center seal portion 11 and the closing seal 13 are also connected by a die molding, so that no seal cuts are formed in the connecting portion thereof, and that no seal cuts are formed in the entire portion of the weather strip 10. Therefore, the weather strip 10 is good in restraining an occurrence of a wind noise, and it is further improved in the noise insulation property.

It should be noted that as illustrated in FIGS. 9 and 10, in the aforementioned first and second preferred embodiments, there can be formed a hole portion 15b in a outside wall 15a of a roof seal 15 nearby the center seal portion 11, in communication with a hollow portion 15c of the roof seal 15.

With such a structure, the hole portion 15c enables the draining of water 60, such as trapped water, in a gap formed between the outside wall 15a and the door panel 1a or washing water to outside the automobile through the hole portion 15b and the hollow portion 15c of the roof seal 15 by dropping the water in the air hole portion 13a of the closing seal 13. Therefore, the water 60 invading into an interior of the automobile through a gap between a bottom surface of the roof seal 15 and the door panel 1a is prevented.

It should be noted that a weather strip for a double door of an automobile according to the invention can be installed not only to a rear door 1 of a side door but also to a back door or another type of door which forms a double door.

What is claimed is:

1. A weather strip for a double door of an automobile comprising a center seal portion and a seal body wherein, said center seal portion comprises a main seal and a closing seal;

said seal body is integrally formed with a roof seal, an end seal and a lower seal;

an upper end portion of said closing seal of said center seal portion is connected to an edge end portion of said roof seal of said seal body; and a lower end portion of said closing seal of said center seal portion is connected to an edge end portion of said lower seal of said seal body.

2. A weather strip for a double door of an automobile claimed in claim 1 wherein, said roof seal comprises an outside wall nearby said center seal portion;

said outside wall comprises a hole portion formed therethrough communicating with a hollow portion of said roof seal;

said hole portion is used to pass water therethrough and drain it outside of the automobile via an air hole portion of said closing seal; and said water is trapped in a gap between said outside wall of said roof seal and a door panel of the automobile.

3. A weather strip for a double door of an automobile comprising a center seal portion and a seal body wherein, said center seal portion comprises a main seal and a closing seal;

said seal body is integrally formed with a roof seal, an end seal and a lower seal;

an upper end portion of said closing seal of said center seal portion is connected to an edge end portion of said roof seal of said seal body; and a lower end portion of said seal portion is connected to an edge end portion of said lower seal of said seal body.

4. A weather strip for a double door of an automobile claimed in claim 3 wherein, said roof seal comprises an outside wall nearby said center seal portion;

said outside wall comprises a hole portion therethrough communicating with a hollow portion of said roof seal;

said hole portion is used to pass water therethrough and drain it outside of the automobile via an air hole portion of said closing seal; and said water is trapped in a gap between said outside wall of said roof seal and a door panel of the automobile.

* * * * *